United States Patent [19]

Winslow et al.

[11] Patent Number: 5,580,303
[45] Date of Patent: Dec. 3, 1996

[54] CRAB PROCESSING MACHINE

[76] Inventors: Charles C. Winslow, 621 NW. 45th St., Seattle, Wash. 98107; John E. Fritsch, 4721 36th Ave. SW., Seattle, Wash. 98126

[21] Appl. No.: 404,922

[22] Filed: Mar. 16, 1995

[51] Int. Cl.$^6$ ................................................ A22C 29/04
[52] U.S. Cl. ................................................ 452/1; 452/120
[58] Field of Search ................................. 452/1, 18, 170, 452/160

[56] References Cited

U.S. PATENT DOCUMENTS

| | | |
|---|---|---|
| 3,302,236 | 2/1967 | Harris ................................. 452/1 |
| 3,495,293 | 2/1970 | Tolley . |
| 3,495,294 | 2/1970 | Reinke . |
| 3,596,310 | 2/1971 | Tolley . |
| 3,611,478 | 2/1971 | Lockerby . |
| 4,073,041 | 2/1978 | Davis et al. . |
| 4,293,981 | 10/1981 | Smith . |
| 4,337,552 | 7/1982 | Iwase ................................. 452/1 |
| 4,380,094 | 4/1983 | Tolley et al. . |
| 4,479,284 | 11/1984 | Tolley et al. . |
| 4,503,586 | 3/1985 | Cockerby et al. ................. 452/1 |
| 5,320,575 | 6/1994 | Fukamoto .......................... 452/1 |
| 5,370,573 | 12/1994 | Warren et al. ................... 452/170 |

FOREIGN PATENT DOCUMENTS

| | | | |
|---|---|---|---|
| 6133684 | 5/1994 | Japan | 452/1 |

*Primary Examiner*—Willis Little

[57] ABSTRACT

This invention is a high speed crab butchering machine that entails several novel features. Crab are transported through the machine by sandwiching their legs between pairs of opposed, resilient-surface endless belts. The distance between belt pairs is varied to accomodate crab of any body width. This is accomplished by making a lengthwise section of the machine slideable on machine-ways. Linear actuators vary the distance between belt-pairs manually or automatically. A rotating cleaving blade removes the carapace and tail and splits the crab body, in one operation. Furthermore, the blade is only activated when a crab is sensed to be in position. This allows the operator to feed the machine at any time and he does not have to concentrate on engaging an indexing mechanism with the crab as in the prior art. Additionally, the belts and blade are electronically torque limited to ensure safety.

9 Claims, 4 Drawing Sheets

CRAB PROCESSING MACHINE

BACKGROUND OF THE INVENTION

This invention relates to live crab butchering apparatus and more particularly to such machines intended to produce two clean sections of shoulders with legs attached.

Despite numerous attempts to automate the process, the large crab species of the North Pacific and other areas are still predominately butchered by hand. This high-paced, repetitive motion task results in large medical and insurance costs for both shore-based and floating processing plants. As the competition for this resource has increased the need for a fast, simple, and reliable machine to perform this job has grown more acute.

Flohr Metal Fabrication of Seattle, Wash., is currently marketing an automatic crab butchering machine that attempts to fill this need.(U.S. Pat. No. 5,401,207) This machine is receiving poor reception in the industry due to its high complexity and cost. Furthermore, this machine is capable of butchering the Bairdi and Opillio species but not the King Crab species which are substantially larger.

U.S. Pat. No. 4,293,981 to Charles M. Smith discloses a crab butchering machine specifically intended for the above species. This machine also suffered poor reception due to complexity and lack of ready accomodation for the wide range of crab sizes.

U.S. Pat. No. 4,073,041 Davis et al, shows a crab butchering machine wherein the crab are input into the machine with their carapace down, as in the present invention. The similarity ends here, however, as this machine is designed for small crab species known as "Rock", "Jona" and "Blue" crab.

There are numerous other patents disclosing machines intended to process small crab species. This prior art is of limited applicability in that none of these machines have been modified to successfully process the larger species even though there has been substantial economic impetus to do so.

The present invention is a significant advance over the above prior art in several ways. First, all of the above machines utilize a crab conveying method that entails an indexing system that the operator must match to some part of the crab during the infeed process. This requires both concentration and time. Accordingly, such machines are fatiguing to operate and have low potential maximum production rates. In the present invention, crab can be fed at any time, as fast as the operator can feed them. Secondly, the machine of this invention adjusts rapidly to accomodate large variations in crab size. Third, the removal of the carapace and tail, and the splitting of the crab body are performed in one operation. Next, this invention utilizes a unique combination of gilling and cleaning implements to ensure high quality crab sections that are ready to pack.

Additionally, the machine of the present invention is inherently safe. Most of the prior art employs a sharp rotary saw blade to split the crab body. This invention utilizes a blunt-edge blade that won't cut skin. Also the blade is torque limited as are the high-friction belts that convey the crab. A few extra pounds of resistance will produce an instant power stoppage.

SUMMARY OF THE INVENTION

It is the principal object of this invention to provide a crab butchering machine that is simple in design and reliable in operation.

It is a second object to provide a crab butchering machine that is ergonomically easy to feed and yields a high production rate.

It is a third object to provide a crab butchering machine that adjusts readily to a large range of crab sizes.

It is a further object of this invention to provide a crab butchering machine that produces uniform and clean sections.

It is an additional object to provide a crab butchering machine that is safe to operate.

To these ends, this machine is composed of 6 systems: 1. Crab transport. 2. Carapace/tail removal and body splitting. 3. Gilling and cleaning. 4. Width adjustment. 5. Safety. 6. Operator interface or infeed.

Crab are transported through the machine by sandwiching the legs between two pairs of high-friction endless belts. Spring biased rollers on the top belt tracks ensure a tight grip on the crab sections.

The carapace and tail are removed in one piece and the body is split on center by a cleaving blade. This blade is analogous to the blade utilyzed so successfully in the hand butchering process to perform all three of these functions in one step. In this machine, however, the blade is mounted for rotary motion and only rotates when a crab is sensed to be in position. This is accomplished by a high-cycle-rate electric clutch-brake module that repositions the blade in the same position after one rotation, ready for the next crab. A counter linked to the clutch-brake control unit displays the production rate and number of crabs processed. Additionally, angled tabs can be fastened to each side of the blade to break off the mandibles that would otherwise remain on the shoulders.

After splitting, water jets directed at the shoulders begin the viscera removing process. Next, the gills are removed from both shoulders by spring-biased high rpm rotary brushes along with more water-jet spray. Since the gills of the King Crab species exibit quite tenacious adhesion, these brushes can be changed out quickly for rotary gear-like implements as are common on manual butchering lines. Two vertical, cone-shaped, high rpm brushes then gently clean the shoulder ends without meat loss. These brushes also incorporate water spray nozzles.

For positive holding of the crab sections, the belts need to grip the the legs close to the shoulders. Since crab bodies can very greatly in width, this type of machine must be able to adjust the gap between the right and left belt pairs. This is done by making one lengthwise half of the machine a separate carriage that is supported on machine-ways, much like the table of a machine-tool. This carriage can be moved by any common means; screw-type linear actuators, rack and pinion gear, or hydraulic cylinders to name a few. A hand or foot operated switch is actuated by the operator to set the machine width to accomodate the size of crab being processed. In an additional embodiment, a pair of proximity switches read the width of each crab as it begins the infeed process and automatically adjusts the machine width. In this automatic mode, a programmable logic controller or PLC keeps track of crab sizes and will not narrow the machine for a smaller crab before the larger crab has cleared the machine. To keep the blade centered during changes in machine width it is mounted on a sliding bearing that allows transmittal of torque. This can be done by providing a square bearing and shaft or by a bearing known as a "ball-spline". Either way, the blade is biased to center by two spring loaded riders, one acting from each side.

In addition to conventional machine guards and emergency stop buttons this machine is provided with an electronic torque limiter on all moving parts that will shut down the power source if activated. For example, if an operator inserts his hand in between a belt pair, a slight amount of resistance backward will stop the machine. The torque threshold is set a few pounds over the drag resistance of several crab in the machine. Furthermore, control power for switches and sensors on the machine is stepped down to 24 volts with all higher voltage elements sealed in a waterproof panel adjacent the machine.

For this machine to be successful, it must interface well with the human operator. The machine must be fast and easy to feed without causing undo strain on the operator. To these ends the infeed process begins with the operator selecting a crab from the hopper adjacent the machine and flipping it on its back. Live crab are much more subdued in this position. The crab is then quickly centered with its carapace protruding below the machine table surface. The operator then smooths the legs flat with outward motion of both hands as he slides the crab forward a few inches into engagement with the belt pairs. The machine quickly takes control of the crab and the operator is free to repeat the process. If the legs curl back up after the operator releases them, they are smoothly spread flat again by tubular angled guides that transition to plates that keep the legs flat during the remainder of the process.

Figure 1:
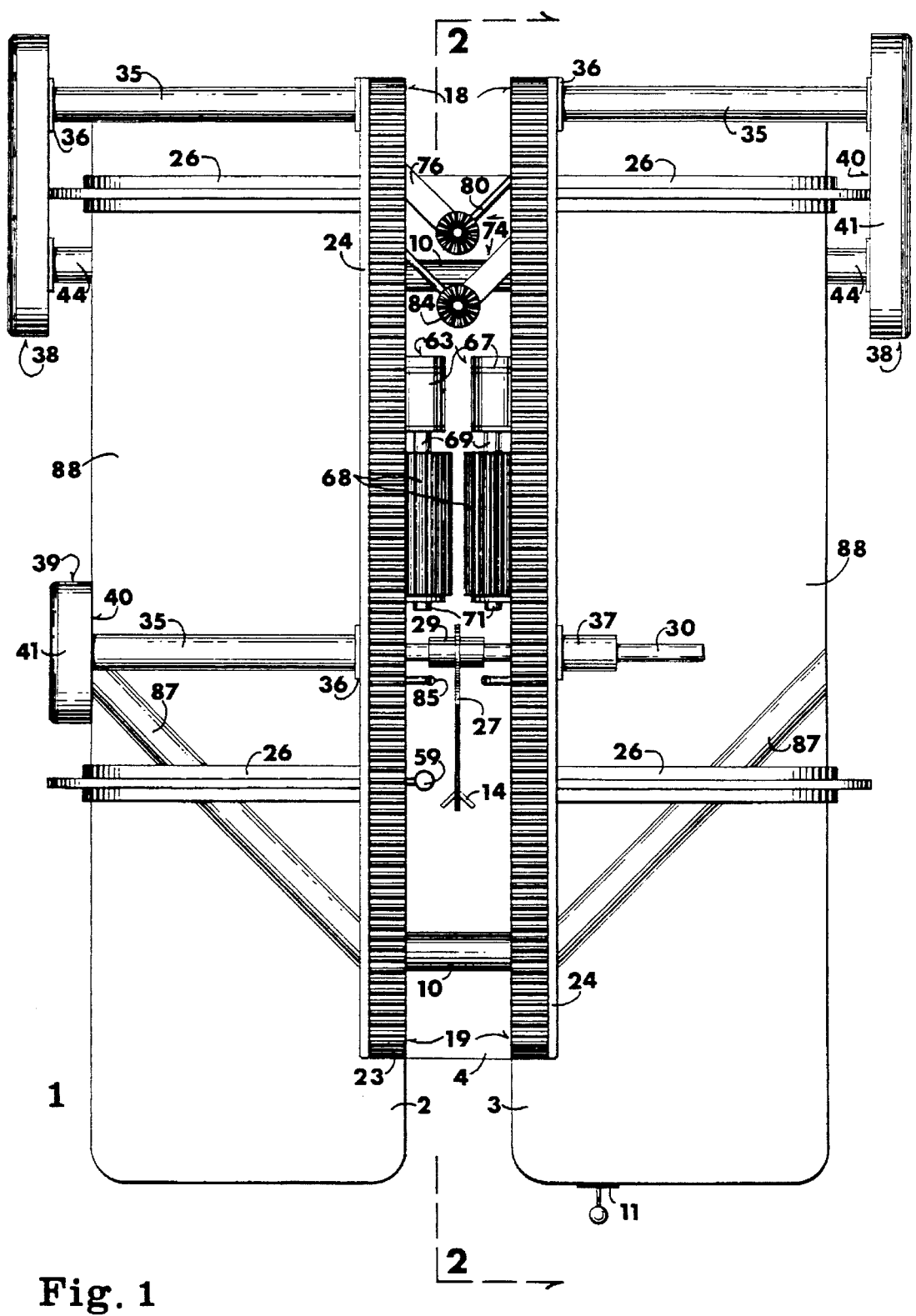
FIG. 1 is a top view of the machine.

In the following detailed description, reference is made to specific materials and to specific machine elements and mechanisms. It is to be understood that the present invention is not to be limited to these specific materials or to the specified arrangements of any of the common machine elements or mechanisms.

The crab butchering machine designated 1 in the drawings is composed of left and right table surfaces 2 and 3 respectively, supported by a generally rectangular base 4, that is of stainless steel tube framework with stainless steel sheetmetal covering. Table 3 is supported by an elongated rectangular subbase 5(see FIG. 2) that is also of stainless steel square tube framing with sheet metal covering. Subbase 5 is slideably supported on base 4 by a pair of machine-ways 6 of stainless steel bottom angles 7 and top angles 8 with UHMW plastic liners 9. These materials and parts provide a durable yet inexpensive sliding couple in the salt water environment although numerous other arrangements are possible. Table 3 is shifted laterally by a pair of hydraulic cylinders 10 to vary the distance between tables 2 and 3 to compensate for variations in crab body width. A hand-actuated directional control valve 11 and flow divider 12(see FIG. 3) controls fluid flow to cylinders 10. Alternately, an electric switch in place of valve 11 can control a solenoid-actuated directional control valve. Valve or switch could also be foot operated. In an additional embodiment the table width can be adjusted automatically by a signal from a control circuit 20 with inputs from proximity switches in the infeed area. This automatic machine-width control system is the subject of an additional patent application and no details are given herein.

In place of the hydraulic cylinders, screw-type actuators or a rack and pinion based system can be employed. The use of hydraulic components in the machine assumes an appropriate hydraulic pressure and volume supply onboard the vessel or in the factory however a suitable hydraulic power unit (not shown) will fit easily within the base 4.

At the facing edges of tables 2 and 3 are provided rotatably supported lower crab transport belts 15.(see FIG. 2) These belts are of the type common in fish filleting and other food processing machinery as the surface is of a resilient nature exhibiting excellent wet grip strength. These flat belts have a v-belt 16 bonded to their back surface for centering and driving traction. It is proposed that cog-type or "gear belts" would be viable alternatives if sanitarily acceptable materials were employed. Furthermore, endless belts with resilent, close-spaced flights of various geometrical designs could be employed. Lower belts 15 are driven at the distal end of the machine by shaft 17 keyed to pulley 18 that is provided with a channel for the above mentioned v-belt. At the proximal end of the lower belts is pulley 19, also provided with a v-groove, that rides on an idler shaft. Lower belts 15 slide along tables 2 and 3 in a groove formed by stainless steel or UHMW plastic flat bars 21. These flat bars provide a raised surface that minimizes the drag of the crab body along the table. Idlers 22 complete the lower belt circuit to provide enough distance between the belt path for gilling and cleaning implement clearance.

Directly above lower belts 15 are upper belts 23 of same composition. Opposed rails 24, of solid-section stainless steel, support the upper belt circuits. As in the lower circuit, shaft 17 keyed to a pulley 18 provides the driving torque with front pulley 19 rotating on an idler shaft. Rails 24 are provided with a multiple of torsion-spring-biased idler-tensioners 25 to ensure a positive grip on the crab legs. Numerous mechanical configurations of idler-tensioners are possible and no further discourse is deemed necessary as these are common machine elements.

Refering to FIG. 1, rails 24 are supported over the tables 2 and 3 by L-shaped arms 26 that are of rigid section design. Arms 26 bolt to the outboard faces of base 4 and are welded to or bolted to the outboard faces of rails 24.

Cleaving blade 27 is of one quarter inch thick stainless steel plate or the like and has a fairly blunt striking edge 28(see FIG. 2)of approximately 90 degrees. A dull edge is necessary to avoid splitting the carapace and tail. Blade 27 is rigidly fixed to ball-spline bearing 29 that allows sliding motion along blade drive shaft 30, yet still allows torque transmittal. As stated above, a square drive shaft and square-bore bearing would suffice in place of the ball-spline. Angled tabs 14 are spot welded to blade 27 near its outer edge of rotation. Tabs 14 serve to remove the mandible. In lieu of the rotating blade it is submitted that an air-cylinder operated, vertically-reciprocating blade will suffice as long as appropriate centering and timing means are employed. Cleaving blade 27 is kept centered between rails 24 by two spring biased guides 31(see FIG. 3) that are constucted of two nested telescoping tubes 32 with an internal compression spring 33 and a roller end 34 that rides on blade 27 near the center of rotation. One guide is fastened to each rail 24. Alternately, it is proposed that a control system that reads the exact center of each crab and axially shifts the blade accordingly, could be utilized.

Belt drive shafts 17 and blade drive shaft 30 are housed in bearing tubes 35(see FIG. 1) that also serve to protect the operator from exposed rotating shafts as well as to keep the shafts and bearings sealed from salt water and viscera contamination. Bearing tubes 35 are of stainless steel pipe or other corrosion resistant material such as brass or bronze. Each tube teminates in a flange 36 for bolting to rails 24 on one end and the sprocket and chain box on the other end. Inboard of the flange on both ends is a standard seal and a bronze or self-lubricated journal bearing.(not shown) It is to be understood that any suitable bearing type is allowable.

Blade shaft 30 also has a shorter bearing tube 37 whose bearing must also allow sliding motion as the table 2 and 3 vary in spacing. Blade shaft 30 protrudes from the bearing with sufficient length to allow for the maximum table travel. Tube 37 may continue outboard and terminate in a cap to totally enclose the protruding end of blade shaft 30.

Belt drive shafts 17 receive torque by a chain-driven sprocket within chain and sprocket case 38. Likewise blade drive shaft 30 receives torque from a chain driven sprocket within chain and sprocket case 39. These cases are of heavy gauge stainless steel sheet metal and are composed of a base plate 40 and removable cover 41. Also within all three cases is an automatic chain tensioner (not shown).

Torque is input into the chain and sprocket cases 38 by left and right input shafts 42 and 43 housed in bearing tubes 44 similar to the ones discussed above. Input shafts 42 and 43 are driven by a sprocket and chain arrangement off of mainshaft 45 in base 4(see FIG.3). Mainshaft 45 is provided with pillow-block bearings 46 and is driven by a hydraulic motor 47. The speed of hydraulic motor 47 is controlled by valve 48. Sprocket 49 on input shaft 43 provides power for the belts on the movable side of the machine and is mounted to a ball-spline 50 (or square sliding bearing) much as in the blade arrangement. A keeper,(not shown) mounted in base 4 ensures that sprocket 49 slides on shaft 43 without sideways strain on the chain.

Electronic torque sensing is accomplished by control circuit 51 monitoring the hydraulic pressure differential across motor 47 with pressure transducer 52. Control circuit 51 is set to ignore the pressure spike resulting from the cleaving of a crab and allows a steady differential threshold equal to the drag resistance of several crab in the belts. If, however, a pressure rise of greater than the threshold or a pulse of longer duration than normal is sensed, control circuit 51 locks out hydraulic pressure to motor 47 by way of solenoid 53. Solenoid 53 can also be activated by emergency stop buttons 54 on the machine. In lieu of the hydraulic motor, an electric motor with gear reduction and appropriate torque sensing can be substituted.

Hydraulic motor 47 also transmits power to the blade. Chain 55 drives a sprocket on the input side 56 of electric clutch-brake module 57. Chain 55 is also provided with a spring biased idler to maintain proper chain tension (not shown). The output shaft 58 of clutch-brake module 57 provides power to chain and sprocket case 39 for the blade. Clutch-brake module 57 is controlled by a signal from a proximity switch 59 that senses when a crab approaches the blade. Swith 59 is supported off of either rail 24 and is linearly adjustable for fine-tuning the blade timing. Numerous switching schemes are possible here. In a preferred embodiment a laser switch is employed. Other optical switches as well as capacitive and ultrasound proximity switches, whisker-type contact switches and roller end switches that sense the rise of the upper belt or idler are all within the spirit of this disclosure. Before a crab approaches, blade 27 is positioned at a point such as that shown by the phantom lines in FIG. 2. Upon activation of switch 59, blade 27 completes one rotation—through the crab—and is braked to a stop at the initial position. Control unit 60 for the clutch-brake module is within panel 61 that also houses the control unit 20 for the automatic table adjustment and control circuit 51 for torque sensing as well as the 24 volt transformer 62 and other wiring. Panel 61 is of NEMA 4× construction and can be mounted on the machine or nearby.

Figure 3:
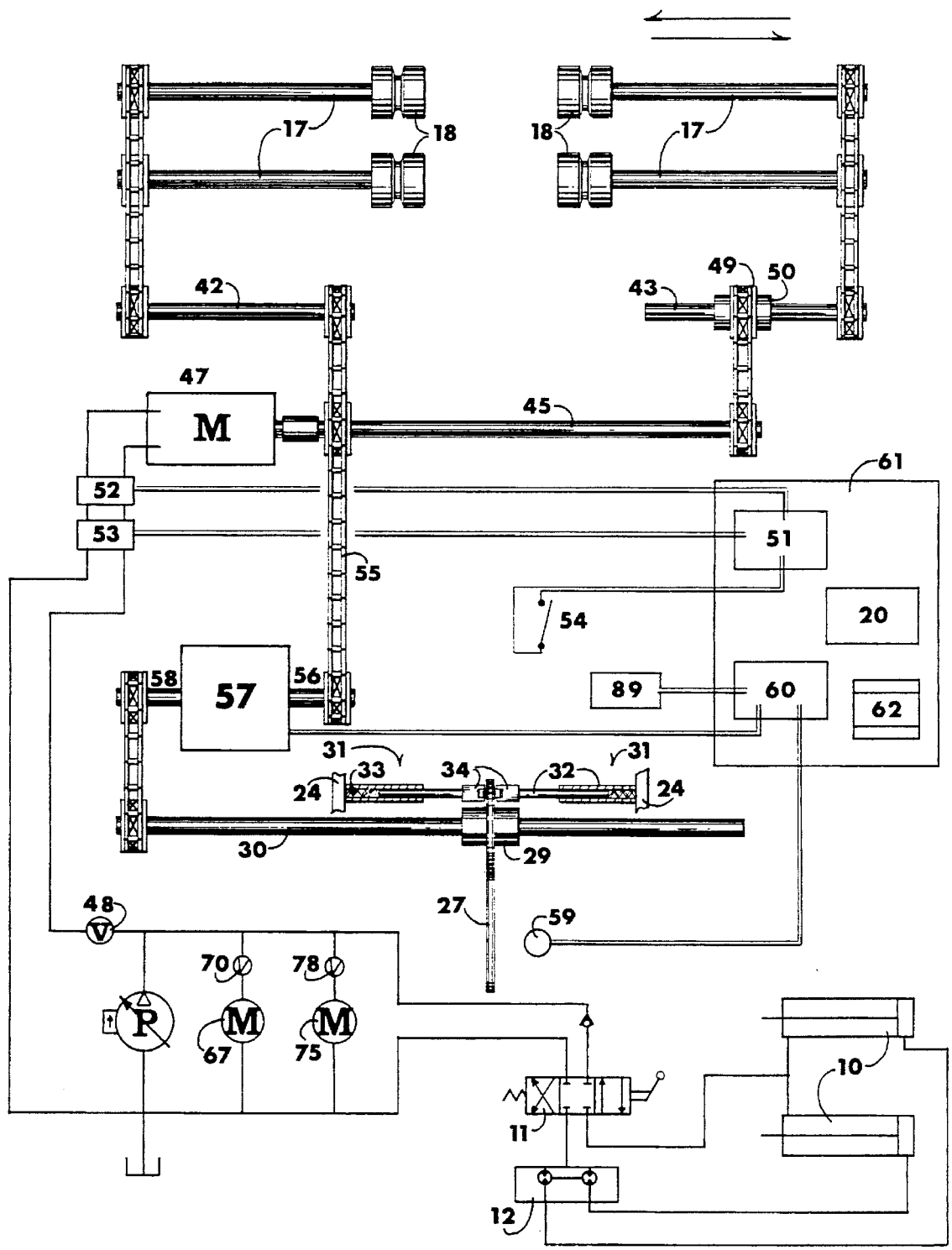
FIG. 3 is a schematic diagram of the power flow in the machine and the control systems.
Figure 4:
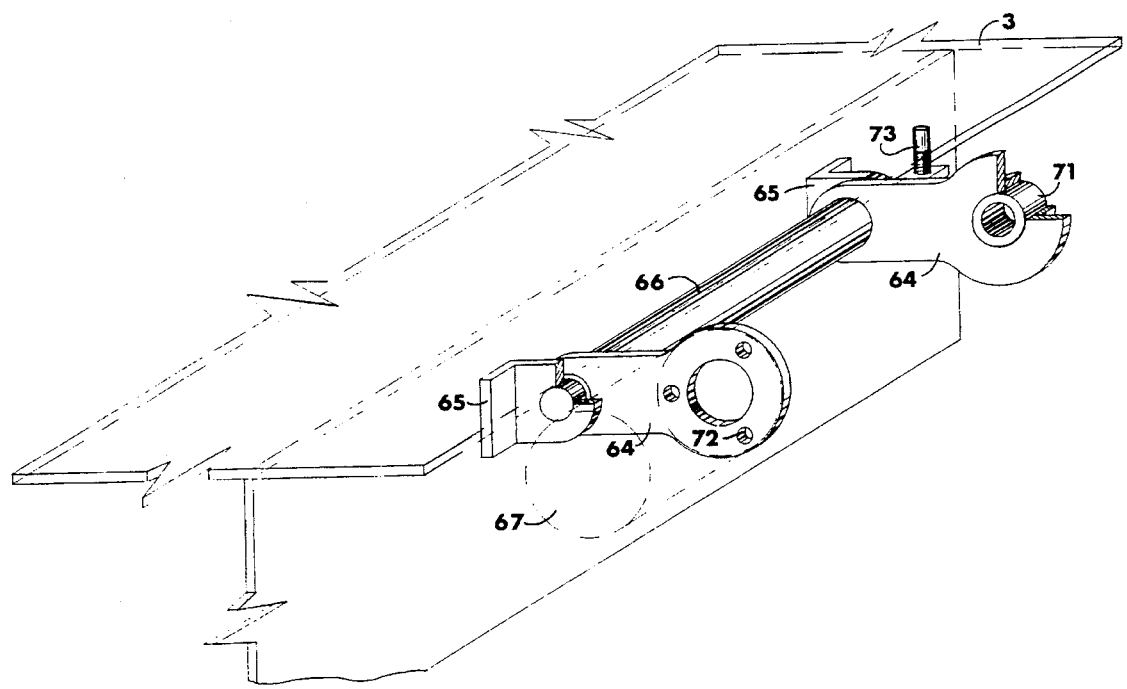
FIG. 4 is an perspective view of a gilling implement mounting arrangement.

Referring now to FIG. 1 for the top view and FIG. 4 for the detail, a gilling implement assembly 63 is composed of a rigid frame 64, pivots 65, and an internal torsion spring (not shown) inside frame tube 66. A high rpm hydraulic motor 67 mounts to one arm of frame 64 by way of bolts through holes 72. Motor 67 is coupled to the shaft of brush 68 by means of a rigid keyed coupling 69. A control valve 70 (see FIG. 3) regulates the speed of motor 67. Back to FIG. 4, the other arm of frame 64 is provided with a bearing 71 for the end of the brush shaft. A srew-type stop 73 limits the upward pivot of frame 64. The upward spring bias of the gilling implement results in higher contact pressure against the crab shoulder resulting in excellent gill removal. One embodiment of brush 68 is constructed of stiff nylon bristles embedded in a polymer core. For the King Crab and similar species that have stronger gill attachment, these brushes can be replaced by polymer or stainless steel drums of the same length, diameter, and shaft size as the above brushes. On the surface of the drum are fastened square-section bars such as one quarter inch stainless steel key-stock. These bars run axially and are spaced evenly around the drum with at least a quarter inch between sucessive bars. Numerous other combinations of gilling brushes are possible and the axis of the gilling implements need not be strictly horizontal.

Figure 2:
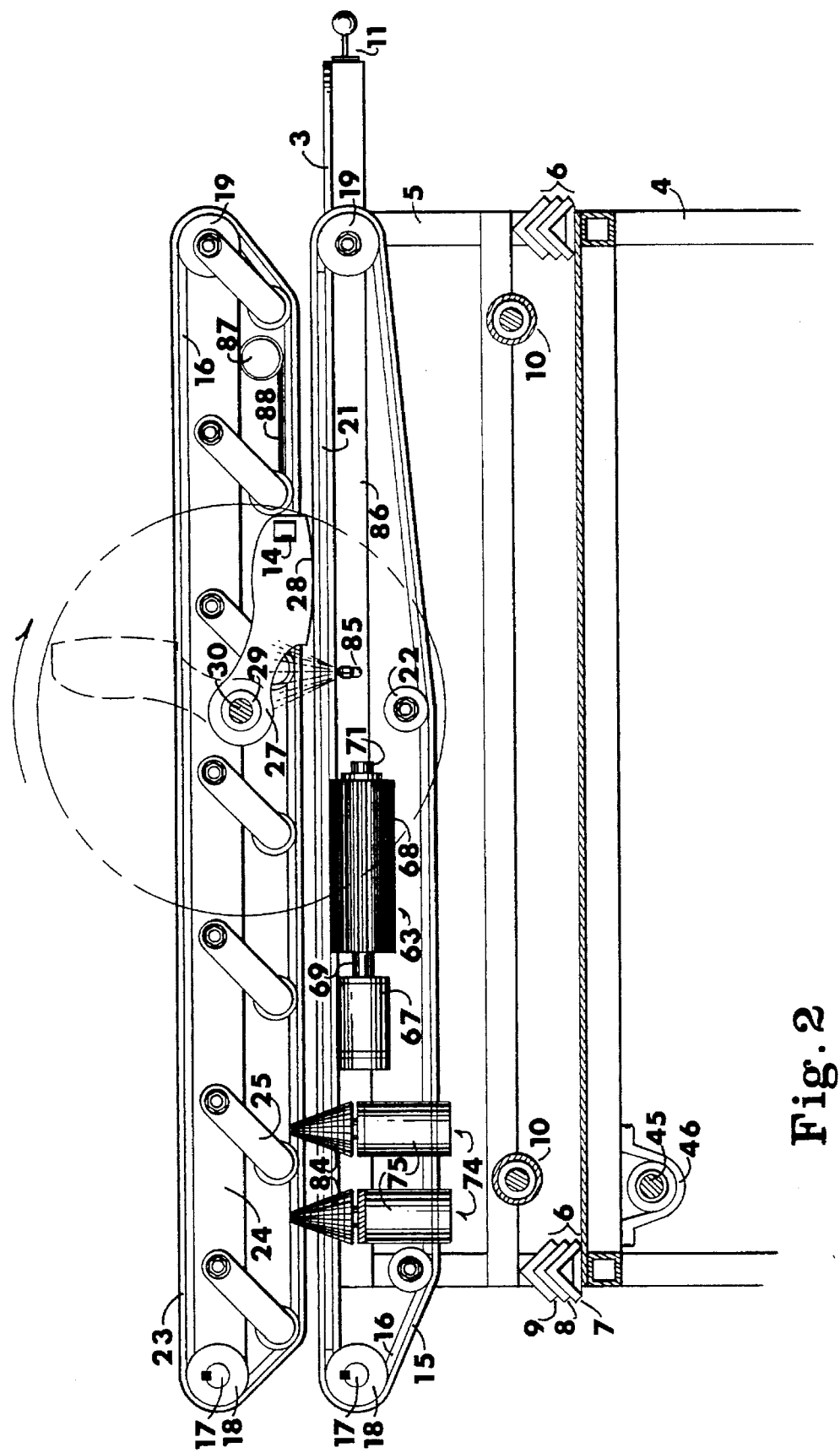
FIG. 2 is a longitudinal sectional view taken across line 2 of FIG. 1 showing the moveable carriage side of the machine.

Referring to FIGS. 1 and 2, a preferred embodiment of a shoulder cleaning implement assembly is designated 74. A high rpm hydraulic motor 75 is bolted to support 76 that is vertically pivoted to a mount on the vertical surface under the inboard overhang of either table 2 or 3. The outboard end of link 80 is also vertically pivoted but from the opposing vertical surface. The other end of link 80 is pivoted about the shaft axis of hydraulic motor 75. It can be seen then, as the distance between table 2 and 3 varies, support 76 and link 80 cooperate to keep the axis of the hydraulic motor centered between tables 2 and 3. Centering of the shoulder-cleaning implements can also be accomplished with any type of actuator controlling the swing of support 76 as long as an appropriate table-position sensing and control means are utilized. On the shaft of hydraulic motor 75 is mounted a cylindrical brush 84 of nylon bristle/plastic core construction. Numerous other arrangements of shoulder cleaning implements are possible. Furthermore, the axis of the shoulder-cleaning implements need not be strictly vertical.

Although both the gilling and shoulder cleaning implements are hydraulic motor powered in the above embodiments, it is to be understood that numerous other powering schemes may be employed. For example, an electric motor placed within the machine base can transmit torque to all implements by means of belts, chains or shafts. Air or water powered turbines could also drive the individual implements.

During the entire butchering process, water is sprayed from a multitude of spray nozzles like the two indicated by number 85 in FIG. 2. These nozzles direct water sprays onto the crab, the blade, the brushes and against the belts and other machine surfaces to keep them clean. Nozzles 85 are plumbed from water manifold 86 that forms part of the stainless steel tubing frame of the machine. A water input is provided on base 4 for connection to the factory water supply. A high pressure pump may be employed and housed within base 4. In either case a good quality duplex strainer should be installed to prevent clogging of the nozzles.

An inclined chute (not shown), fastened between the left and right sections of the machine, carries the water and viscera away. This chute is constructed of overlapping plates to allow for machine width adjustment.

As descibed in the invention summary, the operator feeds the live crab into engagement with the belt pairs. Left and right tubular infeed guides 87 act to unroll the crab's legs as the animal is transported toward the blade. To assure that the legs remain outstretched, tubular guides 87 are immediately followed by guide plates 88 that are supported a couple of inches above the table surface. Plates 88 can be of stainless steel sheet metal or tempered glass or acrylic sheet to allow visibility. At the discharge end of the machine the cleaned crab sections fall onto left and right conveyers (not shown) that lead to packing stations for cooking of the crab. Segregation of left and right sections facilitates packing efficiency. A machine guard (not shown) of overlapping sheet construction covers the entire length of the machine region between rails 24 and can be of acrylic sheet for visibility. Digital counter 89, mounted on the machine or electrical panel, displays production rate and number of crab processed.

We claim:

1. A crab butchering machine, comprising:
   (a) a crab transport means,
   (b) at least one butchering implement,
   (c) motor drive means for said at least one butchering implement,
   (d) a support means for said crab transport means, said at least one butchering implement and said motor drive means,
   (e) said at least one butchering implement comprising a rotatably mounted cleaving blade means with tab-like means at its outer edge of rotation, whereby a crab body will be split into two sections and the carapace, tail and mandible removed, all in one motion of the blade.

2. The machine of claim 1 further including,
   (a) a clutch means interposed between said motor drive means and said rotatably mounted cleaving blade means,
   (b) a crab-sensing switch means operatively coupled to said clutch means whereby said clutch means can be engaged by said crab-sensing switch means.

3. The machine of claim 2 wherein said crab sensing switch means is of the optical type.

4. The machine of claim 1 wherein said crab transport means comprises at least one pair of conjointly moving, resilient surface, endless belts that are rotatably supported in in an elongated circuit whereby crab are conducted to said at least one butchering implement by frictional engagement of the crab body between the opposed facing surfaces of the belts.

5. The machine of claim 1 wherein said support means includes expansion and contraction means whereby crab bodies of varies sizes can be more advantageously secured by said transport means.

6. The machine of claim 5 wherein said expansion and contraction means is provided by at least one fluid pressure cylinder.

7. The machine of claim 5 wherein said expansion and contraction means is provided by at least one rack and pinion gear combination.

8. The machine of claim 5 wherein said expansion and contraction means is provided by at least one screw and nut type actuator.

9. The machine of claim 1 wherein said tab-like means project at a predetermined angle from each face of said rotatably mounted cleaving blade means to provide mandible-removing means.

* * * * *